US012715121B2

(12) United States Patent
Ngo et al.

(10) Patent No.: US 12,715,121 B2
(45) Date of Patent: Aug. 25, 2026

(54) DEVICE AND METHOD FOR CONTROLLING A ROBOT DEVICE

(71) Applicant: Robert Bosch GmbH, Stuttgart (DE)

(72) Inventors: Anh Vien Ngo, Nehren (DE); Bao Huy Le, Tübingen (DE)

(73) Assignee: Robert Bosch GmbH, Stuttgart (DE)

( * ) Notice: Subject to any disclaimer, the term of this patent is extended or adjusted under 35 U.S.C. 154(b) by 107 days.

(21) Appl. No.: 18/426,481

(22) Filed: Jan. 30, 2024

(65) Prior Publication Data

US 2024/0269835 A1 Aug. 15, 2024

(30) Foreign Application Priority Data

Feb. 13, 2023 (DE) ..................... 10 2023 201 140.9

(51) Int. Cl.
*B25J 9/16* (2006.01)

(52) U.S. Cl.
CPC ............... *B25J 9/163* (2013.01); *B25J 9/161* (2013.01)

(58) Field of Classification Search
CPC . B25J 9/161; B25J 9/163; G05B 2219/37325; G05B 2219/39271
See application file for complete search history.

(56) References Cited

U.S. PATENT DOCUMENTS

| | | | | |
|---|---|---|---|---|
| 11,921,824 | B1 * | 3/2024 | Hester | G06N 3/045 |
| 2021/0158142 | A1 * | 5/2021 | Luo | G06N 3/045 |

FOREIGN PATENT DOCUMENTS

| | | | | |
|---|---|---|---|---|
| CN | 113894779 | A * | 1/2022 | G06N 3/045 |
| DE | 102018215826 | A1 | 3/2019 | |
| DE | 102019107928 | A1 | 10/2019 | |
| DE | 102020128653 | A1 | 5/2021 | |
| DE | 102019134794 | B4 | 6/2021 | |
| DE | 102021101082 | A1 | 7/2021 | |
| DE | 102021120605 | A1 | 3/2022 | |
| DE | 112020005156 | T5 | 7/2022 | |
| DE | 112020005799 | T5 | 10/2022 | |
| DE | 102021118885 | B4 | 11/2022 | |
| DE | 102022121603 | A1 | 3/2023 | |

OTHER PUBLICATIONS

Vaswani et al., "Attention is All You Need," 31st Annual Conference on Neural Information Processing Systems, (NIPS 2017), Proceedings of NEURIPS, 2017, pp. 5998-6009.

* cited by examiner

*Primary Examiner* — Jerrod Irvin Davis
(74) *Attorney, Agent, or Firm* — Norton Rose Fulbright US LLP

(57) ABSTRACT

A method for controlling a robot device. The method includes: receiving sensor data for a plurality of sensor data types, processing the sensor data of the plurality of sensor data types by an encoding and fusion model which includes a sequence of encoding stages which each includes an encoding layer for each of the sensor data types generating features for the sensor data of the sensor data type, a plurality of fusion layers which each combine features of the multiple sensor data types generated by a respective one of the encoding stages and generating an input for a respective subsequent encoding stage in the sequence of encoding stages and an output stage generating an output from an output of a last encoding stage of the sequence of encoding stages, selecting an action to be performed by the robot device, and controlling the robot device to perform the selected action.

8 Claims, 8 Drawing Sheets

100
101
102
103
104
105
106
107
108
109
110
111
112
113
114
115
116
117
118
119
120
(robot) controller
processor(s)
memory
machine learning model

DEVICE AND METHOD FOR CONTROLLING A ROBOT DEVICE

CROSS REFERENCE

The present application claims the benefit under 35 U.S.C. § 119 of German Patent Application No. DE 10 2023 201 140.9 filed on Feb. 13, 2023, which is expressly incorporated herein by reference in its entirety.

FIELD

The present invention relates to devices and methods for controlling a robot device.

BACKGROUND INFORMATION

Control of a robot device may take into account environmental state information (e.g., sensor data about an environment of the robot device) as well as state information obtained from proprioception of the robot. Both kind of state information (i.e., sensor data types) may be important for training an autonomous robot device. For example, together with the state information obtained from proprioception or haptic data, two-dimensional images may also provide information for a robot device to train well.

However, images often contain a lot of redundant or even confusing information, which can degrade and worsen the training process. Therefore, approaches for effective learning using image data along with state information of other sensor data types are desirable, e.g., approaches which allow improving pixel-based deep reinforcement learning using additional sensor data. This means that such a training should allow fusion of different data modalities (i.e. sensor data types) efficiently, e.g., vision, haptics and proprioception data. In this context, a successful fusion technique would be able to efficiently extract relevant information from input sensor data (including sensor data according to multiple sensor data types) regarding a state of the robot device and its environment to fulfil a given task (like manipulation of an object).

Ashish Vaswani et al. "Attention is all you need." in Proceedings of NeurIPS, pages 5998-6008, 2017, in the following referred to as reference 1, describe a transformer network architecture.

SUMMARY

According to various embodiments of the present invention, a method for controlling a robot device is provided, including receiving sensor data for each of a plurality of sensor data types, processing the sensor data of the plurality of sensor data types by an encoding and fusion model which includes a sequence of encoding stages, wherein each encoding stage includes an encoding layer for each of the sensor data types generating features for the sensor data of the sensor data type, a plurality of fusion layers, each fusion layer combining features of the multiple sensor data types generated by a respective one of the encoding stages and generating an input for a respective subsequent encoding stage in the sequence of encoding stages and an output stage generating an output from an output of a last encoding stage of the sequence of encoding stages, selecting an action to be performed by the robot device using the generated output and controlling the robot device to perform the selected action.

The method according to the present invention described above allows improving performance in a control task by fusing feature information at multiple layers among encoding processes of all multimodalities. This may for example be used in context of deep reinforcement learning for a robot manipulation task.

So, fusion is performed at a plurality of encoding stages (possibly after each encoding stage in the sequence). Thus, there is high information flow among the encoders (i.e. the encoding paths, i.e., encoding layer sequences, for the different sensor data types) allowing meaningful encoding with respect to control. There may in particular be trainable fusion layers after at least two (possibly all) of the "intermediate" encoding layers, i.e., the encoding layers which are not the last encoding layers (i.e., the encoding layers of the last stage in the sequence). Thus, for at least one intermediate encoding layer, there may be a fusion layer before the intermediate encoding layer (i.e., a fusion layer which provides an output on which an input of the intermediate encoding layer depends). The intermediate encoding layers refer to trainable neural network layers, i.e., layers comprising neurons e.g. convolutional layers or fully connected layers. The last encoding layer for each sensor data type may be an encoding layer which performs pooling and flattening and may or may not be trainable.

In the following, various examples are described.

Example 1 is the method for controlling a robot device as described above.

Example 2 is the method of example 1, wherein each fusion layer includes at least one cross attention layer.

This allows efficient combination of features with respect to the given task, i.e. control. For example, each fusion layer includes a transformer encoder (like for example described in reference 1; the fusion layers may like this be implemented in a plug&play manner).

Example 3 is the method of example 1 or 2, wherein, for at least one of the fusion layers, the features of the multiple sensor data types includes multiple components and the fusion layer masks some of the components before combining the features.

This allows reducing the size of the cross attention layer of the fusion layer, especially for early encoding layers where feature dimensions are typically still very high (assuming that, as it is typically the case, feature dimensions decrease over the sequence of encoding stages). Thus, computational cost may be reduced. Furthermore, the masking improves generalization and has a regularization effect.

Example 4 is the method of any one of examples 1 to 3, wherein at least the encoding layers of the encoding stages except for the last encoding stage of the sequence of encoding stages include (or are) multi-layer perceptrons or convolutional layers.

The encoding layers of the last encoding stage may or may not be multi-layer perceptrons or convolutional layer (they may also simply be a pooling and flattening layers). For example, image data may be encoded by convolutional layers while haptic or proprioception data may be encoded by multi-layer perceptrons. This allows efficient encoding.

Example 5 is the method of any one of examples 1 to 4, wherein the output stage includes an additional fusion layer combining features of the multiple sensor data types generated by the last encoding stage of the sequence of encoding stages.

In other words, a late fusion layer may be provided in addition to the fusion layers to perform final fusion of the encoded sensor data (e.g. after concatenating the output of the final encoding layers of the final encoding stage of the sequence of encoding stages.

Example 6 is the method of any one of examples 1 to 5, including training the encoding and fusion model.

The encoding and fusion model (e.g. including one or more neural networks) may be trained (before using it for control or while using it for control), for example using reinforcement learning, together with a control strategy according to which the action to be performed is selected using the generated output (which may e.g. be a further neural network). In particular, the encoding and fusion model and other models involved (like a model implementing the control strategy) may be together trained in an end-to-end manner.

Example 7 is a controller, configured to perform a method of any one of examples 1 to 6.

In particular, the controller is configured to implement the encoding and fusion model and a control strategy for selecting actions to be performed by the robot device using outputs of the encoding and fusion model.

Example 8 is a computer program including instructions which, when executed by a computer, makes the computer perform a method according to any one of examples 1 to 6.

Example 9 is a computer-readable medium including instructions which, when executed by a computer, makes the computer perform a method according to any one of examples 1 to 6.

In the figures, similar reference characters generally refer to the same parts throughout the different views. The figures are not necessarily to scale, emphasis instead generally being placed upon illustrating principles of the present invention. In the following description, various aspects of the present invention are described with reference to the figures.

DETAILED DESCRIPTION OF EXAMPLE EMBODIMENTS

The following detailed description refers to the figures that show, by way of illustration, specific details and aspects of this disclosure in which the present invention may be practiced. Other aspects may be utilized and structural, logical, and electrical changes may be made without departing from the scope of the present invention. The various aspects of this disclosure are not necessarily mutually exclusive, as some aspects of this disclosure can be combined with one or more other aspects of this disclosure to form new aspects.

In the following, various examples will be described in more detail.

Figure 1:
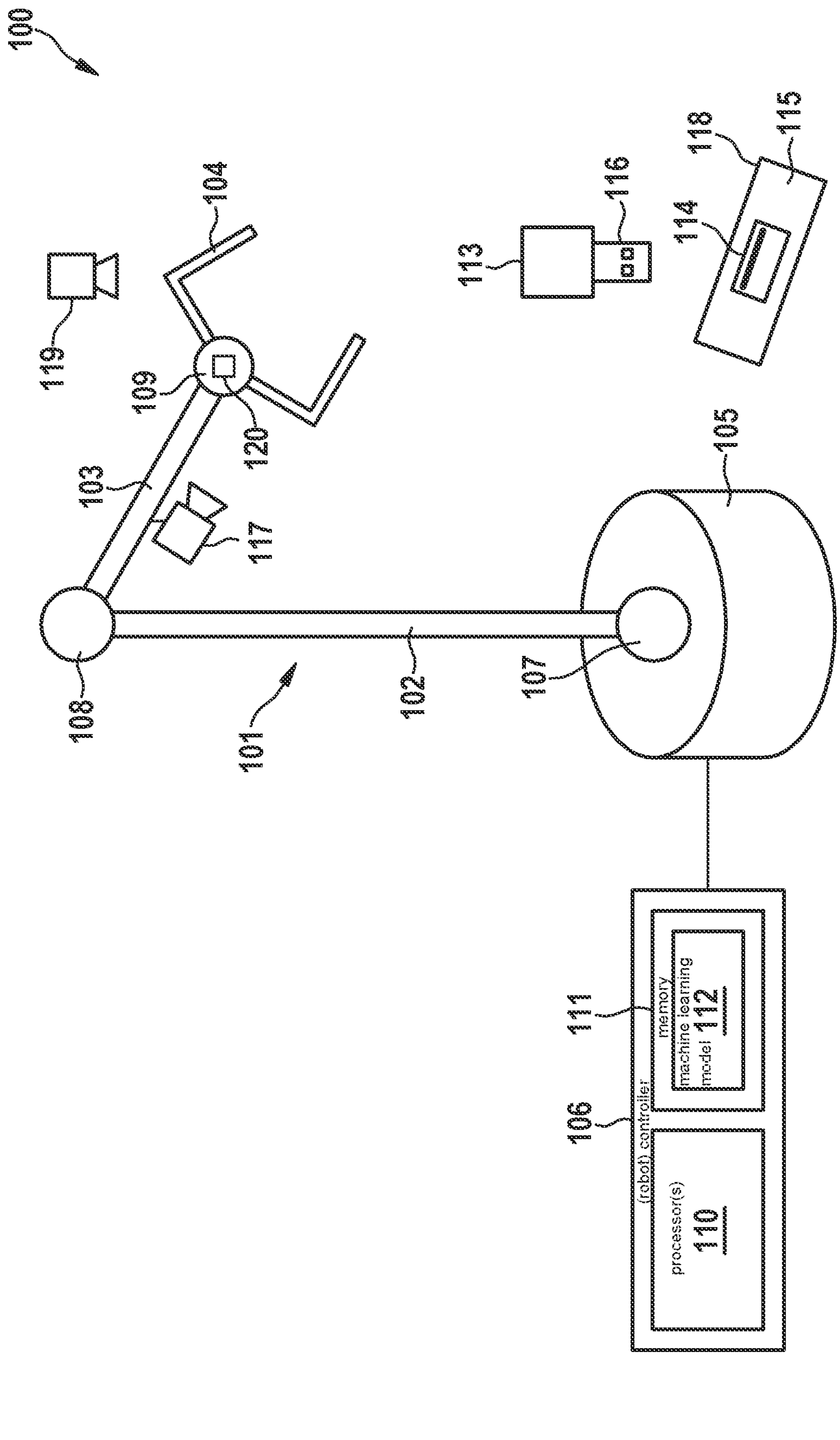
FIG. 1 shows a control scenario according to an example embodiment of the present invention.

FIG. 1 shows a robot 100.

The robot 100 includes a robot arm 101, for example an industrial robot arm for handling or assembling a work piece (or one or more other objects). The robot arm 101 includes manipulators 102, 103, 104 and a base (or support) 105 by which the manipulators 102, 103, 104 are supported. The term "manipulator" refers to the movable members of the robot arm 101, the actuation of which enables physical interaction with the environment, e.g. to carry out a task. For control, the robot 100 includes a (robot) controller 106 configured to implement the interaction with the environment according to a control program. The last member 104 (furthest from the support 105) of the manipulators 102, 103, 104 is also referred to as the end-effector 104 and may include one or more tools such as a welding torch, gripping instrument, painting equipment, or the like.

The other manipulators 102, 103 (closer to the support 105) may form a positioning device such that, together with the end-effector 104, the robot arm 101 with the end-effector 104 at its end is provided. The robot arm 101 is a mechanical arm that can provide similar functions as a human arm (possibly with a tool at its end).

The robot arm 101 may include joint elements 107, 108, 109 interconnecting the manipulators 102, 103, 104 with each other and with the support 105. A joint element 107, 108, 109 may have one or more joints, each of which may provide rotatable motion (i.e., rotational motion) and/or translatory motion (i.e. displacement) to associated manipulators relative to each other. The movement of the manipulators 102, 103, 104 may be initiated by means of actuators controlled by the controller 106.

The term "actuator" may be understood as a component adapted to affect a mechanism or process in response to be driven. The actuator can implement instructions issued by the controller 106 (the so-called activation) into mechanical movements. The actuator, e.g. an electromechanical converter, may be configured to convert electrical energy into mechanical energy in response to driving.

The term "controller" may be understood as any type of logic implementing entity, which may include, for example, a circuit and/or a processor capable of executing software stored in a storage medium, firmware, or a combination thereof, and which can issue instructions, e.g., to an actuator in the present example. The controller may be configured, for example, by program code (e.g., software) to control the operation of a system, a robot in the present example.

In the present example, the controller 106 includes one or more processors 110 and a memory 111 storing code and data according to which the processor 110 controls the robot arm 101. According to various embodiments, the controller 106 controls the robot arm 101 on the basis of a machine learning model 112 stored in the memory 111.

According to various embodiments of the present invention, the machine learning model 112 is configured and trained to allow the robot 100 to perform a certain task, like an inserting task, for example inserting a plug 113 in a corresponding socket 114. For this, the controller 106 takes pictures of its environment, here the plug 113 and socket 114 by means of cameras 117, 119. The robot 100 (in particular its controller 106) obtains a visual observation of its environment.

Further, the robot 100 may have information from proprioception, i.e., a proprioception state as well as a haptics state (like from a sensor in the end-effector by which it can detect that it has grabbed an object).

The controller 106 has data of multiple modalities at its disposal, in this example images, data from proprioception and further sensor data (e.g., haptics data).

A modality generally refers to a particular way of doing or experiencing something, and multimodality means a combination of two or more modalities. A modality refers to a source or form of information in the context of machine learning. Each modality has different information and perspectives on the surrounding environment (in the example of FIG. 1 the robot's workspace including the plug 113 and the socket 114). Some modalities share redundancy information (crossover), some give missing information from single modality (complementarity), and some even have a variety of different information interactions between them. For this reason, if the multi-modal information can be fused properly, rich information (e.g. in form of one or more features determined by a neural network) of the environment can be obtained.

There are three categories of fusion techniques: early, late and intermediate fusion.

- Early fusion: this naive way is used often in tasks where the input modalities are RGB images and depth. Early fusing them would result in RGB-D input with four channels.
- Late fusion: methods in this family often encode each modality separately, then fuse all encoded features at a final latent layer.
- Intermediate fusion: information may also be fused at intermediate layers. A proper implementation of intermediate fusion may outperform other fusion techniques because information between modalities is thus enabled to communicate and exchange at (possibly all) encoding layers, which may help learn a better latent representation of input data. According to various embodiments, this approach is applied for applications in robot learning, where, for at least one intermediate layer, fusion is performed before the intermediate layer.

In the example described above with reference to FIG. 1, as mentioned, each element of the input data includes a visual observation, e.g. an RGB-D image $I \in \mathbb{R}^{4 \times H \times W}$, a proprioception state $x \in \mathbb{R}^n$ and a haptics state $y \in \mathbb{R}^m$. The robot 100 should learn a control policy, e.g. using reinforcement learning, i.e. a RL-based policy, operating on such input data elements, i.e. the controller 106 optimizes a RL-based policy using multi-modality inputs which in this example each have the form (I, x, y). So the objective of the RL problem is to find a policy that maps from (I, x, y) to an action $a \in \mathcal{A}$ (i.e. in an action space) that maximizes task performance, e.g. maximizing a total return of rewards in RL settings (like that the plug 113 is successfully inserted in the socket 114 within a certain time limit).

A fusion operation can be formulated in an abstract manner as follows: assuming that a fusion function f maps an input data element (I, x, y) including all modalities to a D-dimensional fused feature $\theta \in \mathbb{R}^D$ the control policy can be defined as a mapping $$\pi = h \circ f \tag{1}$$

where h is for example implemented by one or more non-linear projection layers, e.g., MLPs (multi-layer perceptrons) that map from $\mathbb{R}^D$ to the action space.

It should be noted that the fusion function is here meant to include encoding of input data. It is therefore also denoted as encoding and fusion function (or model, pipeline, module or (neural) network). According to various embodiments of the present invention, two MLPs are used to encode the proprioceptive input x and haptics input y, respectively, while a neural network of convolutional layers encodes the visual input I. These neural networks (MLPs and convolutional neural network) may all be part of the machine learning model 112. The result of the encoding includes visual features $\theta_v \in \mathbb{R}^{D \times N \times N}$ (i.e. D-dimensional features of a N×N feature map), proprioceptive features $\theta_p \in \mathbb{R}^D$, and haptics features $\theta_h \in \mathbb{R}^D$. In addition to the encoding, the fusion function f includes a fusion operation of these three modalities which is denoted as visual-proprioceptive-haptics fusion.

Figure 2:
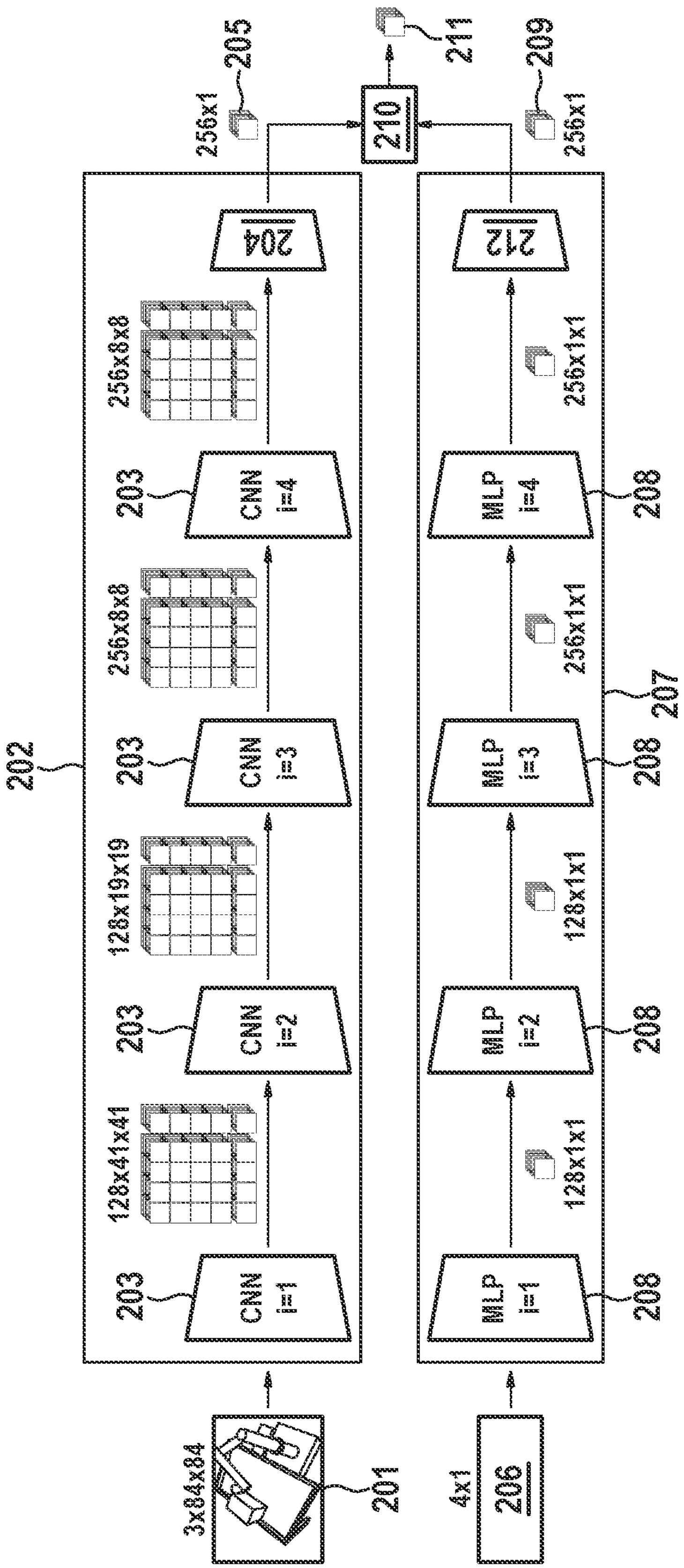
FIG. 2 illustrates late fusion, according to an example embodiment of the present invention.

FIG. 2 illustrates late fusion.

As explained above, an input image 201 (here an RGB image) is encoded by a convolutional neural network 202 (image or visual encoder) including convolutional layers 203 as (intermediate) encoding layers and an average pooling and flattening layer 204 (which may be seen as last encoding layer) to visual features 205.

A proprioception state 206 (e.g. including end-effector position and gripper width) is encoded by a MLP 207 (proprioception encoder) including a sequence of MLP layers (in particular hidden layers) 208 as (intermediate) encoding layers and a flattening layer 212 (which may be seen as last encoding layer) to proprioceptive features 209. The encoding of the haptic state information to haptic features is omitted for simplicity but may be done analogously to the proprioception state 206 by a haptics encoder.

A late fusion operation 210 (after the last encoding layer) fuses the visual features 205 and the proprioceptive features 209 (and may similarly fuse haptic features). The results of the fusing are one or more fused features 211 which are the input to the function h of equation (1).

The late fusion operation 210 may require that that all features (also denoted as latent features) to be fused included flattened features of the same length. Therefore the average pooling and flattening layer 204 flattens the features output by the preceding convolutional layer 203. Alternatively, an additional MLP may be used to map D×N×N features to D, e.g. using pooling. This mapping generates the (flattened) visual features 205 for example as $$g(\theta_v) = \theta_v^* \in \mathbb{R}^D.$$

Examples for the late fusion operation 210 are

- Mean and max pooling: these two kinds of fusion have a similar operation. the fused feature is computed as $$\theta_{mean} = \text{mean}(\theta_v^*, \theta_p, \theta_h) \text{ and } \theta_{max} = \max(\theta_v^*, \theta_p, \theta_h),$$

respectively.

- Concatenation: this fusion operation is simply computed as $$\theta_{cat} = concat(\theta_v^*, \theta_p, \theta_h) \in \mathbb{R}^{3D}$$

Bayesian fusion: this fusion technique exploits Bayes theorem to aggregate information from different inputs, i.e. using standard Gaussian conditioning. In essence, it computes a posterior of the fused features conditioning on input features $\theta_v^*$, $\theta_p$, $\theta_h$. Assuming that each input feature is a Gaussian random variable with mean and variance (a diagonal variance), $\mu$ and $\sigma^2$ (assuming that each feature is divided into two parts, each with a length of D/2). Specifically, the Gaussian distribution for each feature is represented as $$(\mu_v, \sigma_v^2), (\mu_p, \sigma_p^2), (\mu_h, \sigma_h^2)$$

and assuming that a Gaussian prior of the fused distribution is $$(\mu_0, \sigma_0^2)$$

fusing them using Bayes theorem gives a fused distribution $$(\mu_{out}, \sigma_{out}^2)$$

where $$\frac{1}{\sigma_{out}^2} = \frac{1}{\sigma_0^2} + \sum_{i \in \{v,p,h\}} \frac{1}{\sigma_i^2}$$

$$\mu_{out} = \mu_0 + \sigma_{out}^2 \sum_{i \in \{v,p,h\}} \frac{(\mu_i - \mu_0)}{\sigma_i^2}.$$

Figure 3:
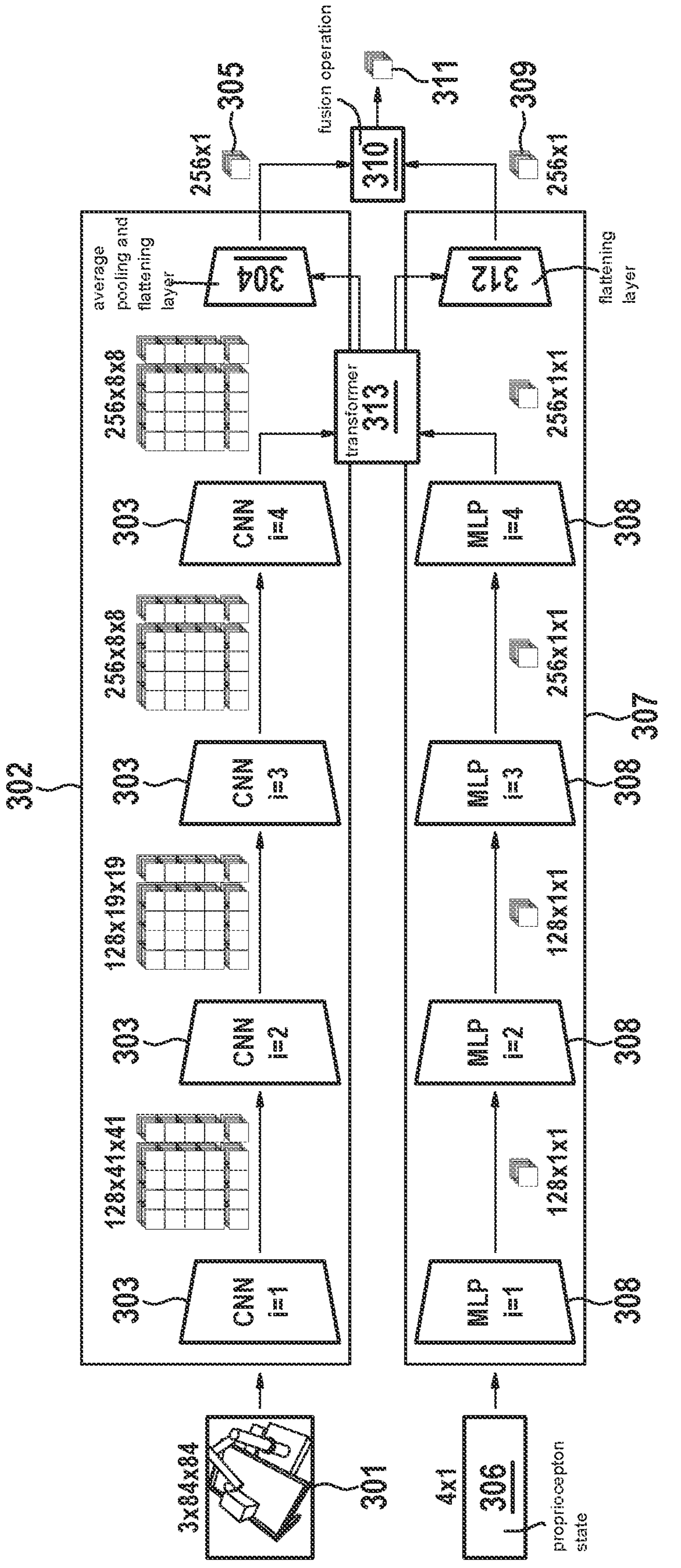
FIG. 3 illustrates transformer-based fusion, according to an example embodiment of the present invention.

FIG. 3 illustrates transformer-based late fusion.

As described with reference to FIG. 2, an input image 301 is encoded by a convolutional neural network 302 including convolutional layers 303 and an average pooling and flattening layer 304 to visual features 305 and a proprioception state 306 is encoded by a MLP 307 including a sequence of MLP layers (in particular hidden layers) 308 and a flattening layer 312 to proprioceptive features 309. Again, the encoding of the haptic state information to haptic features is omitted for simplicity.

The architecture of FIG. 3 differs from the one of FIG. 2 in that a transformer 313 is included between the average pooling and flattening layer 304 and the preceding convolutional layer 303 as well as the flattening layer 312 and the preceding MLP layer 308.

Further, as in FIG. 2, the features 305, 309 are processed by a late fusion operation 310 which generates one or more fused features 311.

Figure 4:
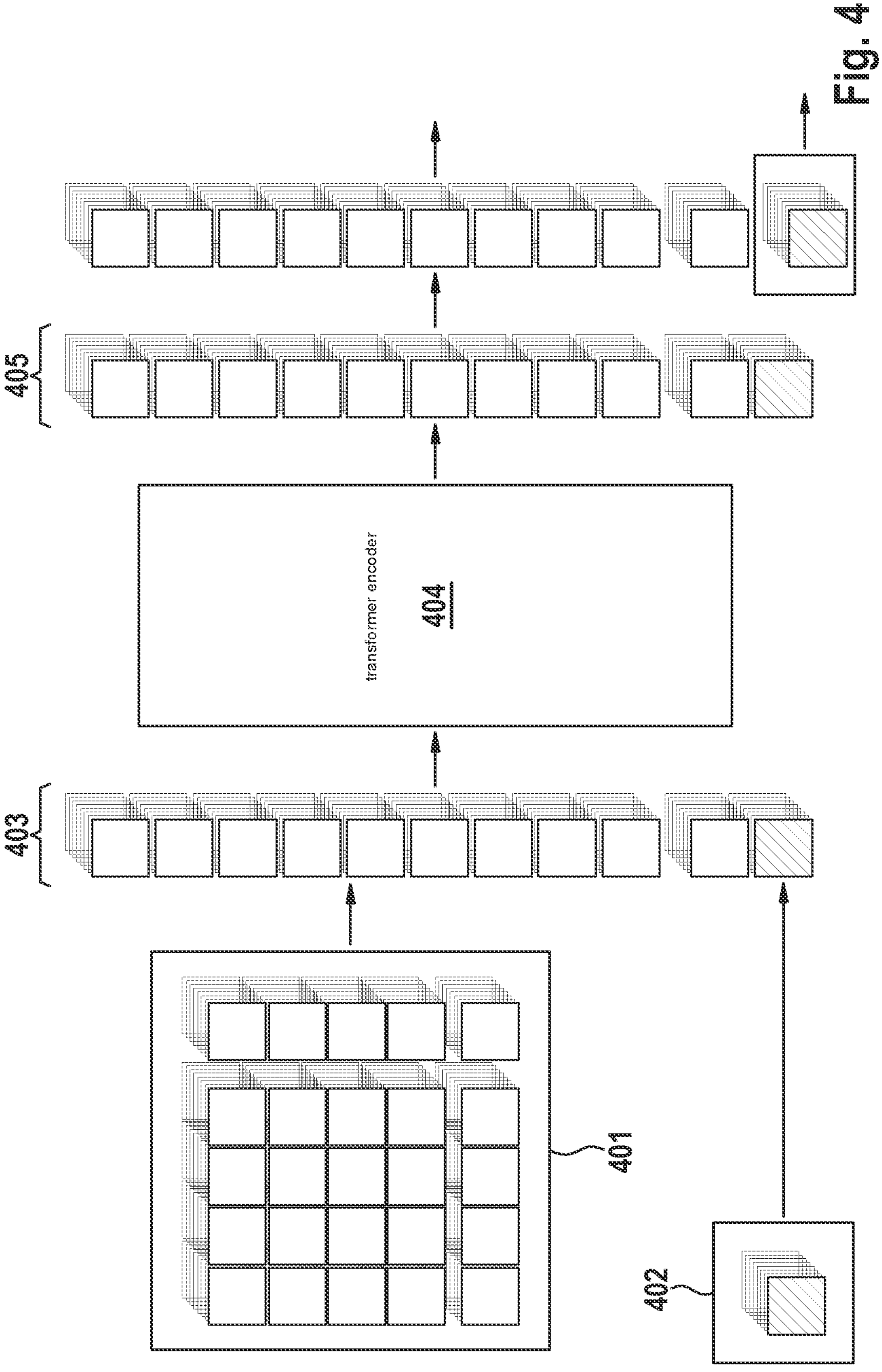
FIG. 4 shows an architecture of a transformer, according to an example embodiment of the present invention.

FIG. 4 shows an architecture of the transformer 313.

The transformer receives visual features (i.e. a feature map) 401 as well as proprioceptive features 402 and arranges them to a vector of tokens 403 which is then processed by a transformer encoder 404 to a result vector 405 which is separated into a visual feature result vector (output to the average pooling and flattening layer 304) and a proprioception feature result (output to the flattening layer 312).

In case of visual, proprioceptive and haptic features ($\theta_v$, $\theta_p$, $\theta_h$) output by the last convolutional layer or MLP layer, respectively, these are re-arranged to obtain N×N+2 tokens and written as the vector of tokens $\Theta_{in} \in \mathbb{R}^{(N^2+2) \times D}$ which is processed by the transformer encoder 404.

The transformer 313, in particular the transformer encoder 404, may for example be configured as described in reference 1.

Figure 5:
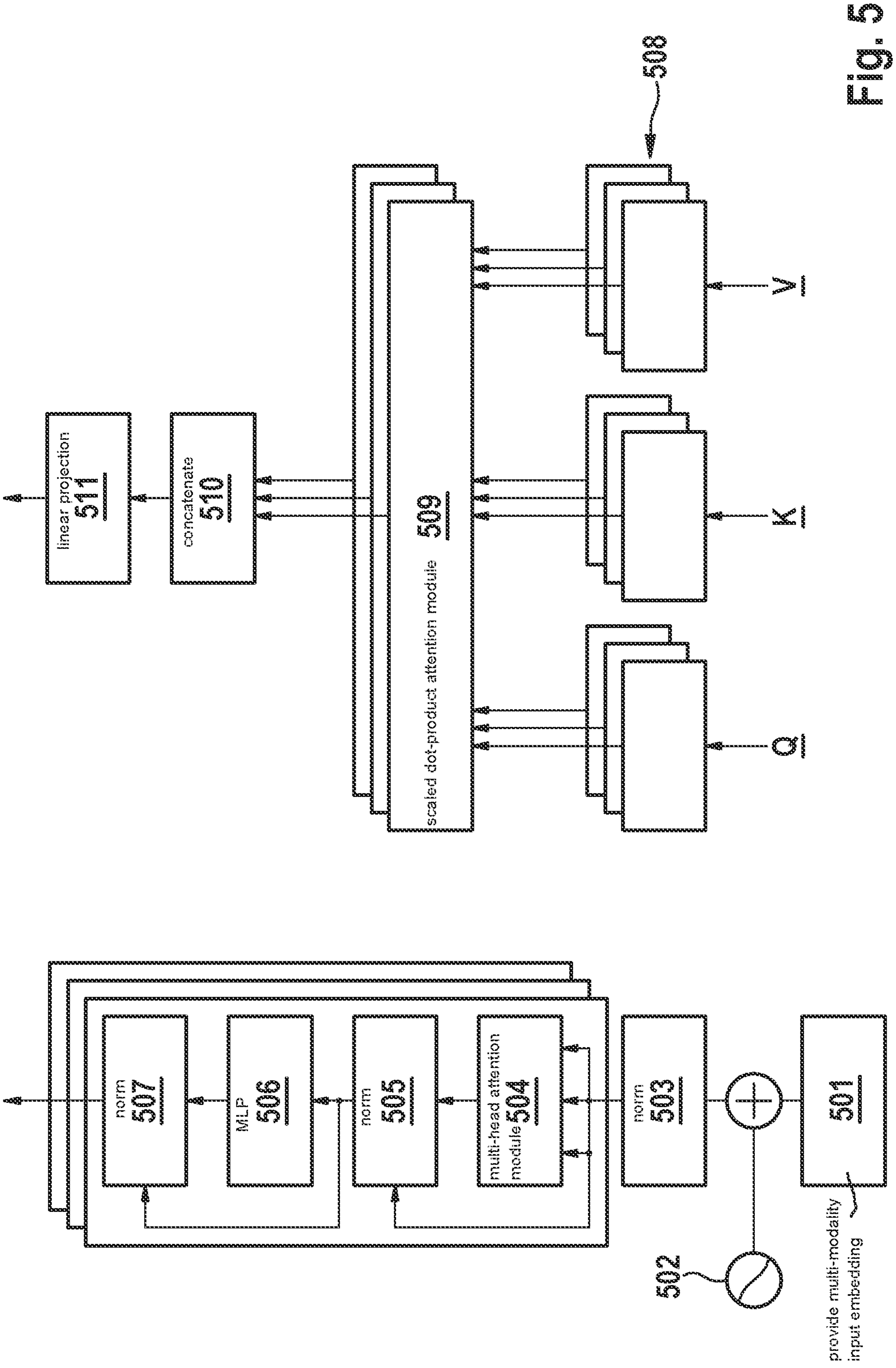
FIG. 5 illustrates the functionality of a transformer encoder, according to an example embodiment of the present invention.

FIG. 5 illustrates the functionality of the transformer encoder 404.

The multi-modality input embedding 501, also denoted as $F_{in}$, corresponding to the vector of tokens $\Theta_{in}$ is provided with a positional embedding 502 (to reflect the position of the tokens within, for example, the image feature map) and normed 503. It is then fed to a multi-head attention module 504 whose output is added to its input and normed 505, processed by an MLP 506 whose output is added to its input an normed 507.

The multi-head attention is determined (as illustrated on the right hand side of FIG. 5) by a set of queries, keys and values denoted as (Q, K, V) that are parameterized by weights $M_q \in \mathbb{R}^{D \times D_q}$, $M_k \in \mathbb{R}^{D \times D_k}$, $M_v \in \mathbb{R}^{D \times D_v}$ as $$Q = \Theta_{in} M_q,\ \ K = \Theta_{in} M_k,\ \ V = \Theta_{in} M_v.$$

A scaled dot-product attention module 509 determines the attention weights as $$A = softmax\left(\frac{QK^T}{\sqrt{D_k}}\right)V.$$

The attention weights are concatenated 510. Linear projections 508 and 511 may be performed before the scaled dot-product attention module 509 and after the concatenation.

The output of the transformer decoder is finally determined by the MLP 506 with residual connections and layer norms (LN) as $$F_{out} = \mathrm{LN}(MLP(A) + F_{in})$$

Multiple projection heads or multi-layer transformer layers can also be used. The output $F_{out}$ has a similar shape as the input $\mathbb{R}^{(N^2+2) \times D}$, and is re-arranged to again provide three embeddings ($\bar{\theta}_v$, $\bar{\theta}_p$, $\bar{\theta}_h$). For example, average pooling is used on the visual embedding to receive a D-dimensional feature, then concatenate it with the other two embeddings to obtain a 3*D-dimensional feature which is then used as input for the function h of the policy of equation (1).

According to various embodiments, in order to fully leverage information communication across modality encoders, information communication is allowed over all (or at least more) encoding layers.

Figure 6:
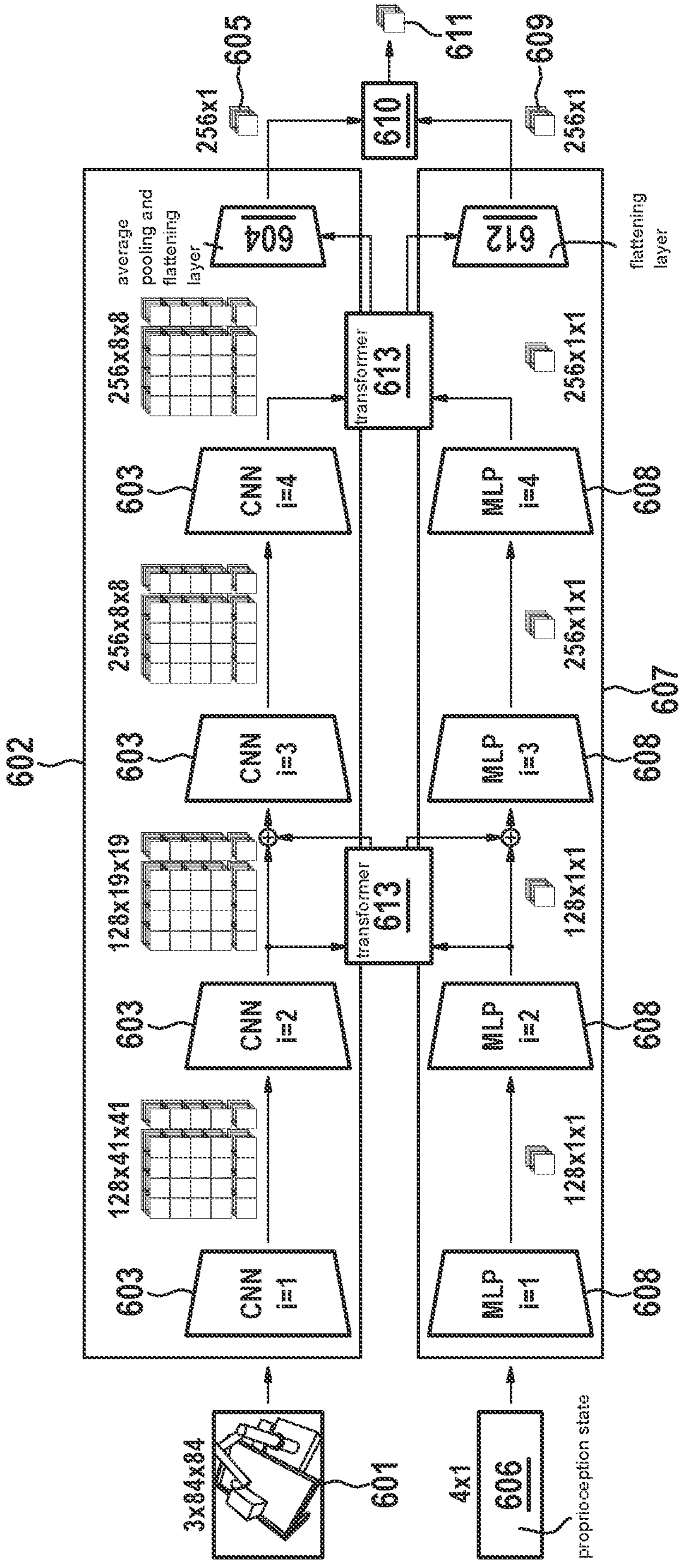
FIG. 6 illustrates transformer-based fusion according to an example embodiment of the present invention.

FIG. 6 illustrates transformer-based fusion according to an embodiment.

As described with reference to FIG. 2, an input image 601 is encoded by a convolutional neural network 602 including convolutional layers 603 and an average pooling and flattening layer 604 to visual features 605 and a proprioception state 606 is encoded by a MLP 607 including a sequence of MLP layers (in particular hidden layers) 608 and a flattening layer 612 to proprioceptive features 609. Again, the encoding of the haptic state information to haptic features is omitted for simplicity.

The architecture of FIG. 6 differs from the one of FIG. 2 in that, for a plurality of encoding layers, a transformer 613 is included after the respective encoding layer (of all encoders) which combines the features output by the encoding layers. This means that the outputs of the encoding layers of a certain (intermediate) encoding stage, e.g. the ith encoding layer of each encoder, are fed to a transformer 613 and fused.

A transformer 603 may in particular be arranged before an intermediate encoding stage (like in FIG. 6 before the third encoding stage). For such an encoding stage, for each encoder, the result of the fusion by the transformer 603 is added to the output of the preceding encoding layer and the result of the addition is supplied to the encoding layer of the encoder.

It is assumed that the modality encoder's layers have the following shapes $$\text{visual encoder: } (D_1 \times H_1 \times W_1), \ldots, (D_L \times H_L \times W_L)$$

$$\text{proprioception encoder: } (D_1), \ldots, (D_L)$$

$$\text{haptics encoder: } (D_1), \ldots, (D_L)$$

The features output by the encoding layers of, e.g., the ith stage are fused by the respective transformer 613 using a cross-attention operation as described with reference to FIG. 5. The output after fusion after encoding stage i has the shape $$F^i_{out}$$

$\in \mathbb{R}^{(H_i * W_i + 2)}$ which can be rearranged to have three respective intermediate features $$(\theta_v^{i,out}, \theta_p^{i,out}, \theta_h^{i,out})$$

as input to the next encoding stage i+1 (possibly added to the output of the encoding stage i as mentioned above). The features are continued to be encoded by the encoders (visual, proprioception and haptics) to receive features $$(\theta_v^{i+1,in}, \theta_p^{i+1,in}, \theta_h^{i+1,in})$$

as output of the i+1-th encoding stage (which may be fed to a transformer 613 of (i.e. after) the i+1-th encoding stage, hence the superscript "in") and so on.

The transformers 613 may be configured like the transformer 313 described with reference to FIG. 5. However, according to various embodiments, the transformers are Masked Multi-Modal Fusion Transformers (MMFTs).

Figure 7:
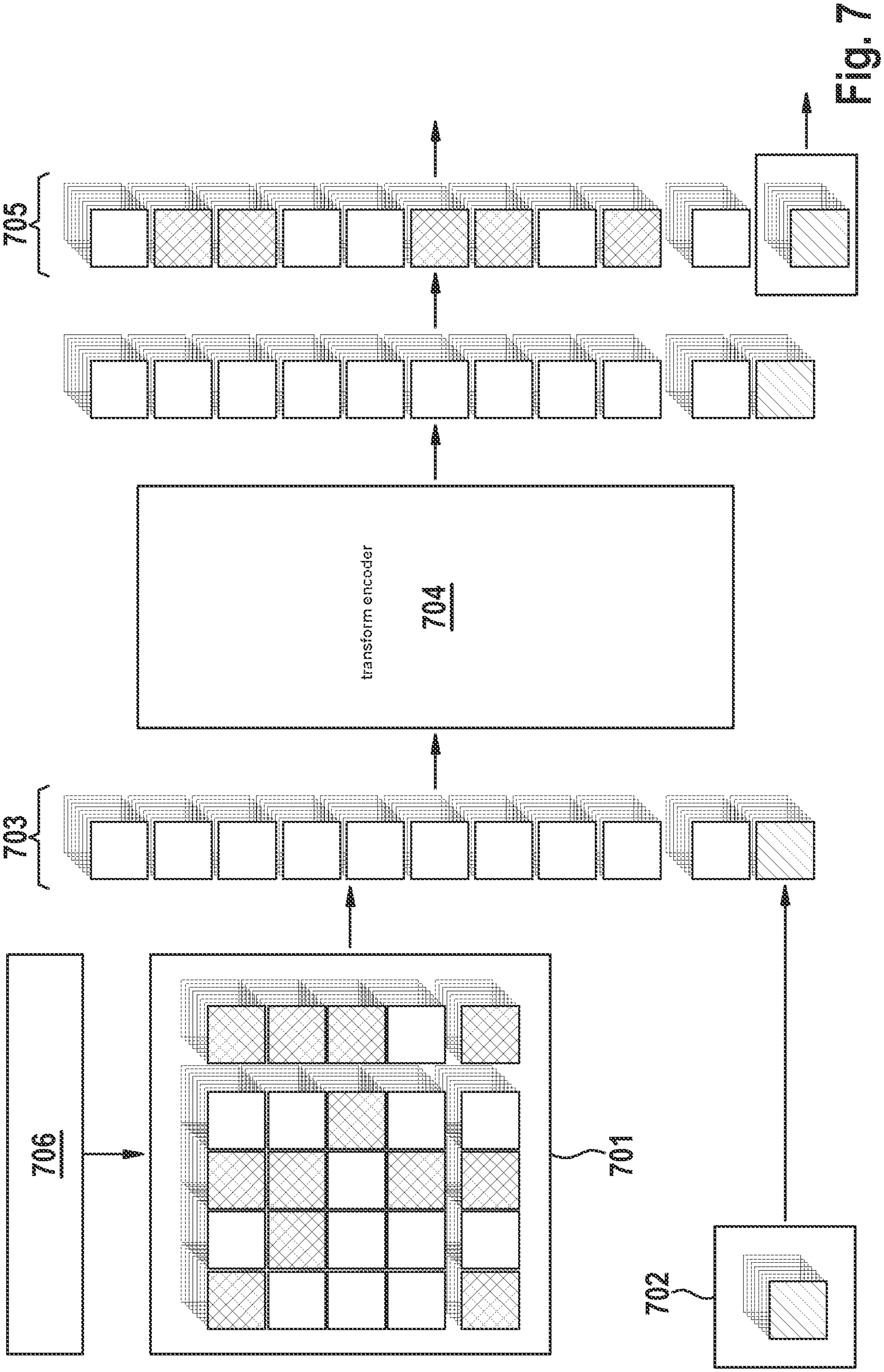
FIG. 7 shows an architecture of a Masked Multi-Modal Fusion Transformer according to an example embodiment of the present invention.

FIG. 7 shows an architecture of an MMFT 613.

Like the transformer 313 described with reference to FIG. 3, the MMFT 613 receives visual features (i.e. a feature map) as well as proprioceptive features 702. However, before arranging them to a vector of tokens 703 which is then processed by a transformer encoder 704 to a result vector 705 which is separated into a visual feature result vector (output to the average pooling and flattening layer 704) and a proprioception feature result (output to the flattening layer 612), the visual features are partially masked by a masking operation 706 to partially masked visual features 701 (i.e. a partially masked feature map where features for certain patches are set to zero; e.g. there is a $D_i$-dimensional feature for each patch for the MMFT 613 after the ith-encoding stage).

This means that random patches of the visual feature map is masked by the MMFT 613 (for each stage i where there is an MMFT). Thus, the fusion at each stage only operates on the visible patches. Masking with a high proportion of features can both yield higher performance due to strong regularization, and reduce computation costs due to attention operations on high-dimensional inputs, especially at early layers.

Each MMFT 613 may mask the visual features with a predefined ratio. The visual features remaining after the masking (i.e. the features of unmasked patches) are flattened and concatenated with the proprioceptive features 602 as input to the transformer encoder 604. After that, the output of the transformer encoder 604 is rearranged such that results for unmasked patches go into their corresponding patch location while the masked patches are zero in the result vector 605.

The transformer encoder 604 may be configured as described with reference to FIG. 5.

All the fusion techniques described above relate to the function f of equation (1). Accordingly, any actor-critic algorithm can be used to learn end-to-end the policy n as defined in equation (1). For example, soft actor-critic (SAC), which is an off-policy algorithm, may be used for optimizing n.

Figure 8:
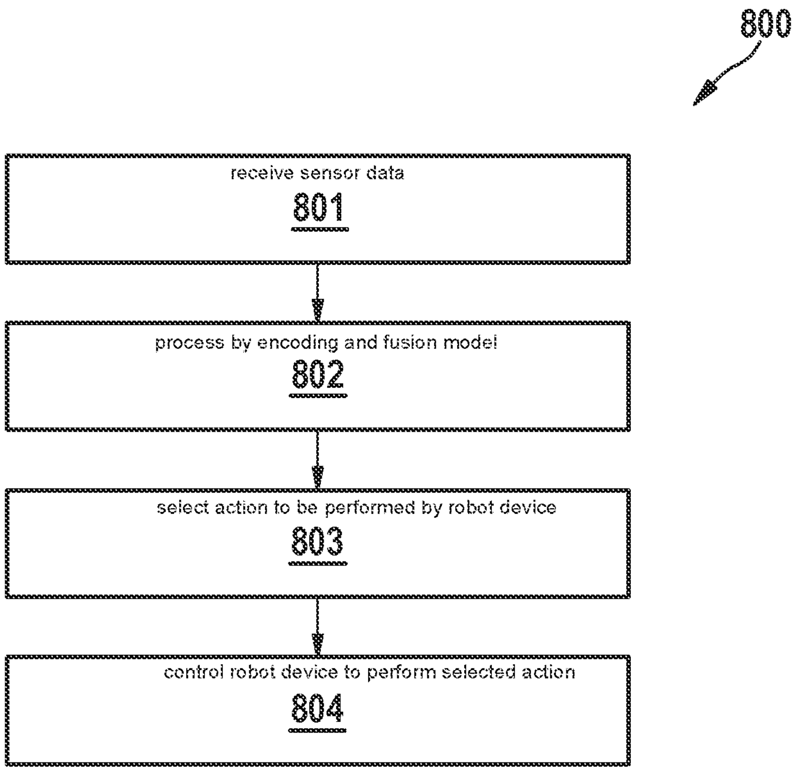
FIG. 8 shows a flow diagram illustrating a method for controlling a robot device according to an example embodiment of the present invention.

In summary, according to various embodiments, a method is provided as illustrated in FIG. 8.

FIG. 8 shows a flow diagram 800 illustrating a method for controlling a robot device according to an embodiment.

In 801, sensor data is received for each of a plurality of sensor data types.

In 802, the sensor data of the plurality of sensor data types is processed by an encoding and fusion model. The encoding and fusion model includes

- a sequence of encoding stages, wherein each encoding stage includes an encoding layer for each of the sensor data types generating features for the sensor data of the sensor data type;
- a plurality of fusion layers, each fusion layer combining features of the multiple sensor data types generated by a respective one of the encoding stages and generating an input for a respective subsequent encoding stage in the sequence of encoding stages; and
- an output stage generating an (output stage) output (i.e. encoded sensor data or, in other words, a latent representation of the sensor data) from an (encoding stage) output of a last encoding stage of the sequence of encoding stages.

In 803, an action to be performed by the robot device is selected using the generated (output stage) output (i.e. the output of the output stage).

In 804, the robot device is controlled to perform the selected action.

The approach of FIG. 8 can be used to compute a control signal for controlling a technical system, like e.g. a computer-controlled machine, like a robot, a vehicle, a domestic appliance, a power tool, a manufacturing machine, a personal assistant or an access control system. According to various embodiments, a policy for controlling the technical system may be learnt and then the technical system may be operated accordingly.

Various embodiments may receive and use image data (i.e. digital images) from various visual sensors (cameras) such as video, radar, LiDAR, ultrasonic, thermal imaging, motion, sonar etc. as well as other sensor data types like pressure, force etc.

According to one embodiment, the method is computer-implemented.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method for controlling a robot device, comprising the following steps:

receiving sensor data for each of a plurality of sensor data types;

processing the sensor data of the plurality of sensor data types by an encoding and fusion model which includes:

a sequence of encoding stages, wherein each encoding stage includes an encoding layer for each of the sensor data types generating features for the sensor data of the sensor data type, a plurality of fusion layers, each fusion layer combining features of the plurality sensor data types generated by a respective one of the encoding stages and generating an input for a respective subsequent encoding stage in the sequence of encoding stages, wherein a first fusion layer of the plurality of fusion layers generates an input for an encoding stage in the sequence of encoding stages and the encoding stage generates an input for a second fusion layer of the plurality of fusion layers, the encoding stage being subsequent to the first fusion layer and the second fusion layer being subsequent to the encoding stage, and an output stage generating an output from an output of a last encoding stage of the sequence of encoding stages;

selecting an action to be performed by the robot device using the generated output; and controlling the robot device to perform the selected action.

2. The method of claim 1, wherein each fusion layer includes at least one cross attention layer.

3. The method of claim 1, wherein, for at least one of the fusion layers, the features of the plurality sensor data types include multiple components and the fusion layer masks some of the multiple components before combining the features.

4. The method of claim 1, wherein at least the encoding layers of the encoding stages except for the last encoding stage of the sequence of encoding stages include multi-layer perceptrons or convolutional layers.

5. The method of claim 1, wherein the output stage includes an additional fusion layer combining features of the multiple sensor data types generated by the last encoding stage of the sequence of encoding stages.

6. The method of claim 1, further comprising training the encoding and fusion model.

7. A controller configured to control a robot device, the controller configured to:

receive sensor data for each of a plurality of sensor data types;

process the sensor data of the plurality of sensor data types by an encoding and fusion model which includes:

a sequence of encoding stages, wherein each encoding stage includes an encoding layer for each of the sensor data types generating features for the sensor data of the sensor data type, a plurality of fusion layers, each fusion layer combining features of the plurality sensor data types generated by a respective one of the encoding stages and generating an input for a respective subsequent encoding stage in the sequence of encoding stages, wherein a first fusion layer of the plurality of fusion layers generates an input for an encoding stage in the sequence of encoding stages and the encoding stage generates an input for a second fusion layer of the plurality of fusion layers, the encoding stage being subsequent to the first fusion layer and the second fusion layer being subsequent to the encoding stage, and an output stage generating an output from an output of a last encoding stage of the sequence of encoding stages;

select an action to be performed by the robot device using the generated output; and control the robot device to perform the selected action.

8. A non-transitory computer-readable medium on which are stored instructions for controlling a robot device, the instructions, when executed by a computer, causing the computer to perform the following steps:

receiving sensor data for each of a plurality of sensor data types;

processing the sensor data of the plurality of sensor data types by an encoding and fusion model which includes:

a sequence of encoding stages, wherein each encoding stage includes an encoding layer for each of the sensor data types generating features for the sensor data of the sensor data type, a plurality of fusion layers, each fusion layer combining features of the plurality sensor data types generated by a respective one of the encoding stages and generating an input for a respective subsequent encoding stage in the sequence of encoding stages, wherein a first fusion layer of the plurality of fusion layers generates an input for an encoding stage in the sequence of encoding stages and the encoding stage generates an input for a second fusion layer of the plurality of fusion layers, the encoding stage being subsequent to the first fusion layer and the second fusion layer being subsequent to the encoding stage, and an output stage generating an output from an output of a last encoding stage of the sequence of encoding stages;

selecting an action to be performed by the robot device using the generated output; and controlling the robot device to perform the selected action.

* * * * *